UNITED STATES PATENT OFFICE.

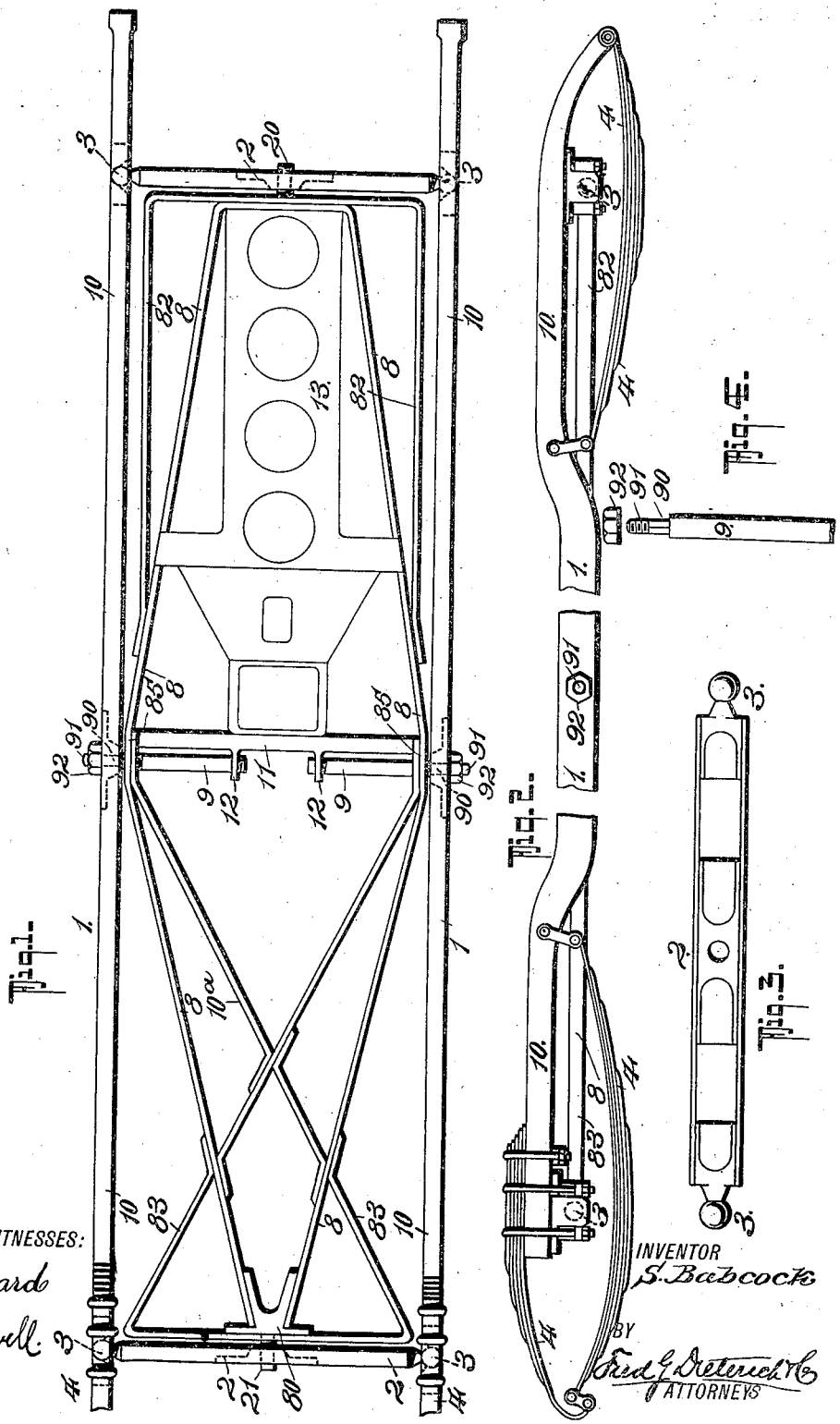

SHERIDAN BABCOCK, OF IOWA FALLS, IOWA.

VEHICLE CHASSIS OR FRAME.

1,071,498.　　　　Specification of Letters Patent.　　Patented Aug. 26, 1913.

Application filed March 12, 1912. Serial No. 683,367.

*To all whom it may concern:*

Be it known that I, SHERIDAN BABCOCK, residing at Iowa Falls, in the county of Hardin and State of Iowa, have invented a new and Improved Vehicle Chassis or Frame, of which the following is a specification.

This invention is a chassis or frame construction, more especially designed for motor vehicles, but applicable to all four wheeled vehicles.

One of the most difficult requirements in the practical development of automobile construction, is to provide a chassis frame of a minimum lightness and yet capable of enduring, indefinitely, the severe and continuous torsional strains, to which it is subjected in passing over uneven road surfaces.

In the manufacture of motor vehicles, the frame must be light, and yet it must rigidly and unyieldingly support the weight of the power mechanism and other parts of the car.

Heretofore it has been considered necessary to build the chassis or frame as rigid and unyielding as possible without increasing the weight to an undesirable amount and, as it, so far as I know, has not been found practicable to prevent the frame from twisting in passing over rough road surfaces, it has usually been the practice to so design the different parts, such as the motor, transmission, clutch, radiator, hood and the body, that there may be as little damage to them, as possible, resultant from the torsional strains that have heretofore been unavoidable.

My invention primarily has for its object to provide an improved construction of chassis or frame in which the several parts are so designed and coöperatively combined whereby I have succeeded in eliminating the above mentioned objectionable features, and whereby to provide for the desired rigidity and unyielding requirements for supporting the weight of the operating mechanism on a chassis or framing of extreme lightness of weight.

My invention also has for its object to provide a chassis or framing of the general character stated of a simple and economical construction and capable of being easily assembled, and with further objects in view, that will hereinafter appear, my invention consists in the peculiar construction and novel arrangement of parts, all of which will be hereinafter fully described, specifically pointed out in the appended claims and illustrated in the accompanying drawings, in which:

Figure 1, is a top plan view of the assembled frame. Fig. 2, is a side elevation of one of the side members of the frame. Fig. 3, is a side view of one of the end members of the frame. Fig. 4, is a plan view of one of the pivotal bearings hereinafter referred to.

In carrying out my invention, I provide, what I term, an outside flexible frame, that consists of opposite side members 1—1 and end or cross members 2—2, the ends of which are flexibly connected to the side members 1—1, preferably by ball and socket joints 3—3, as is clearly indicated on Fig. 1, there being, as it were, a flexible connection at each corner of the outside frame to adapt the said frame for conforming to any road surfaces, rough or smooth.

The buffer springs 4, one for each corner, may be of any approved type and connected to the ends of the side frames 1 in the usual manner.

Coöperating with the outside flexible framing is another framing, hereinafter termed an inner frame, and this frame is, as it were, the unyielding and rigid body upon which the operative parts of the automobile, the motor, clutch, transmission, radiator hood and passenger body, are mounted, the whole, together with the said inner frame, being in the nature of one mechanical formation.

The inner frame consists of a main diamond shaped strap bar frame 8 bent to the general shape stated, the forward end of which is pivotally mounted upon a bearing stud 20 that forms a part of the front cross frame 2 and located centrally thereof.

The rear end of the frame 8 has a bearing block 80 that is pivotally mounted on the stud 21, on the rear cross frame 2 and in longitudinal alinement with the stud 20.

82 designates a U-shaped strengthening or brace section of the inner framing, located in the front end thereof, and 83 designates a somewhat similar shaped brace section secured upon the rear end of the said inner frame, the said sections 82 and 83 being suitably apertured to receive the pivotal studs 20 and 21, as shown.

The inner frame 8, midway its length, at diametrically opposite sides, has apertured bearing portions 85 for receiving the long pivot bolts 9 that are rigidly connected to side frames 1, they having reduced shanks 90, to seat in the correspondingly shaped apertures in the said frame 1, and threaded ends 91 for receiving the clamp nuts 92.

10ª designates another or supplemental frame section that forms a part of the inner frame and is rigidly connected to the frame portion 8, the same being apertured at its opposite ends for the passage therethrough of the long pivotal members 9 and formed with a cross bar 11 having apertured brackets 12 for receiving the inner ends of the long pivots 9.

13 designates diagrammatically, the position of the power plant upon the inner frame.

The frame side members 1 have their ends 10 raised above the general plane of the central portion of the frame.

From the foregoing description, taken in connection with the drawing, the complete construction, the manner of operating and the advantages of my invention, will be readily understood by those skilled in the art to which the invention relates. By forming a rigid and unyielding inner frame, pivotally mounting it at its opposite ends and its opposite sides in the manner shown and described, no torsional strains are transmitted to the inner frame by reason of road roughness acting upon the outer flexible frame. It is also apparent that any road shocks upon the springs at any corner of the outer flexible frame will be equalized upon the other springs and no road shocks will reach the inner frame except at the pivotal bearings therefor, where they disseminate since there is no fixed connection between the inner and the outer frames at such point.

What I claim is:

1. In an automobile chassis, an outer framing that includes end members, side members, the said side members having their opposite ends curved upwardly and extended in a plane above the end members, flexible connections that join the end and the side members, springs located in a plane below the end members and carried by the outer ends of the side members, a body supporting or inner framing pivotally connected to the end members to rock transversely, and bearings that join the opposite sides of the inner frame with the side members of the outer framing.

2. In an automobile chassis an outer rectangular framing, the end members of which have central pivotal bearings, the side members of which have central pivotal bearings, an inner frame consisting of a diamond-shaped body, a strengthening brace frame section for each end of the diamond-shaped body, each of the said sections having a stud for rockably engaging the bearings of the end members of the outer rectangular frame, the said inner frame also including a cross bar having apertured brackets in transverse alinement with the pivotal bearings in the side members of the outer frame, pivot bolts removably engaging the said brackets and the pivotal bearings in the said side members of the outer frame.

3. In an automobile chassis, an outer flexible frame having central opposite pivotal bearings at the front and rear ends in alinement, and like and removable bearings in the sides, in transverse alinement; of an inner rigid and non-yielding frame supported at the opposite ends and the opposite sides on the said bearings, said inner frame including a supplemental section supported in the side bearings and having a cross member having portions supported on the inner ends of the side bearings.

SHERIDAN BABCOCK.

Witnesses:
HARRY L. DIXSON,
S. B. STONEROOK.

---

Copies of this patent may be obtained for five cents each, by addressing the "Commissioner of Patents, Washington, D. C."